United States Patent [19]
Flebbe

[11] Patent Number: 5,246,101
[45] Date of Patent: Sep. 21, 1993

[54] TEMPORARY CONNECTING DEVICE FOR STEEL CABLE CONVEYOR BELTS

[75] Inventor: Heinrich Flebbe, Velber, Fed. Rep. of Germany

[73] Assignee: Continental Aktiengesellschaft, Hanover, Fed. Rep. of Germany

[21] Appl. No.: 775,793

[22] Filed: Oct. 10, 1991

[30] Foreign Application Priority Data

Oct. 27, 1990 [DE] Fed. Rep. of Germany ....... 4034222

[51] Int. Cl.⁵ ............................................. B65G 15/30
[52] U.S. Cl. ................................ 198/844.2; 198/847; 24/31 R; 403/341
[58] Field of Search ........................ 198/844.2, 847; 24/31 W, 31 F, 31 V, 31 R; 474/260, 255; 403/341

[56] References Cited

U.S. PATENT DOCUMENTS 3,945,263  3/1976  Simonsen et al. ................. 198/847
4,489,828  12/1984  Stipdonk ............................. 198/847

FOREIGN PATENT DOCUMENTS 0200578  2/1984  Fed. Rep. of Germany ..... 24/31 R
2118583  11/1983  United Kingdom ............. 198/844.2

Primary Examiner—Robert P. Olszewski
Assistant Examiner—Cheryl L. Gastineau
Attorney, Agent, or Firm—Robert W. Becker & Associates

[57] ABSTRACT

A device for endlessly connecting ends of a steel cable conveyor belt provides a pull-resistant coupling of the oppositely arranged end portions of the steel cables of the conveyor belt whereby the free ends of the individual steel cables are provided with enlargements. The device with which an endless mounting may be realized in a short period of time with simple technical tools at the site, has two abutment pieces with bores. The end portions of the steel cables of each end of the conveyor belt are guided through the bores of the abutment pieces, whereby the free ends of the end portions which protrude from the bores are provided with an enlargement that is greater than the diameter of the bore. The two abutment pieces are connected to one another by separate steel cable sections in a pull-resistant manner. In the middle between the abutment pieces and between the steel cable sections, at least one intermediate piece is inserted before resuming operation of the conveyor belt. The intermediate piece is force-locked with the steel cable sections. The surfaces of the abutment and intermediate pieces that are facing the tensioning and drive rollers are provided with a friction-increasing material.

10 Claims, 2 Drawing Sheets

TEMPORARY CONNECTING DEVICE FOR STEEL CABLE CONVEYOR BELTS

BACKGROUND OF THE INVENTION

The present invention relates to a device for endlessly connecting ends of a ruptured steel cable conveyor belt comprising a plurality of steel cables by pull-resistantly coupling the ends which are oppositely arranged from one another.

Steel cable conveyor belts have been widely accepted in the production processes of the automobile industry. In these production processes a plurality of conveyor belts are usually coordinated with one another so that the endless conveyor belts must be operated with quasi fixed axle distances.

It is common practice that after a rupture of such a steel cable conveyor belt the ends of the conveyor belt are overlapped, and whereby the end sections of the exposed steel cables are inserted into one another and after positioning of rubber cover plates the steel cable conveyor belt connection is produced by vulcanization. This process requires a plurality of tools and machinery and is time consuming and, furthermore, the production process, respectively, the conveying process must be interrupted for this time period. Also, due to the overlapping ends the length of the steel cable conveyor belt is reduced so that for conveyor belts that are coordinated with one another (which requires that the axle distance is fixed) a new steel cable conveyor belt must be provided. Both reasons mentioned above result in a reduced operational availability of the conveyor belt.

It is therefore an object of the present invention to provide a device of the aforementioned kind with which an endless connection of a steel cable conveyor belt may be achieved in a shorter period of time, whereby the connection may be realized at the site of the conveyor belt with simple technical means and whereby the resulting endless connection will participate further in the force transmission between the drive roller and the steel cable conveyor belt.

BRIEF DESCRIPTION OF THE DRAWINGS

This object, and other objects and advantages of the present invention will appear more clearly from the following specification in conjunction with the accompanying drawings, in which.

SUMMARY OF THE INVENTION

Figure 1:
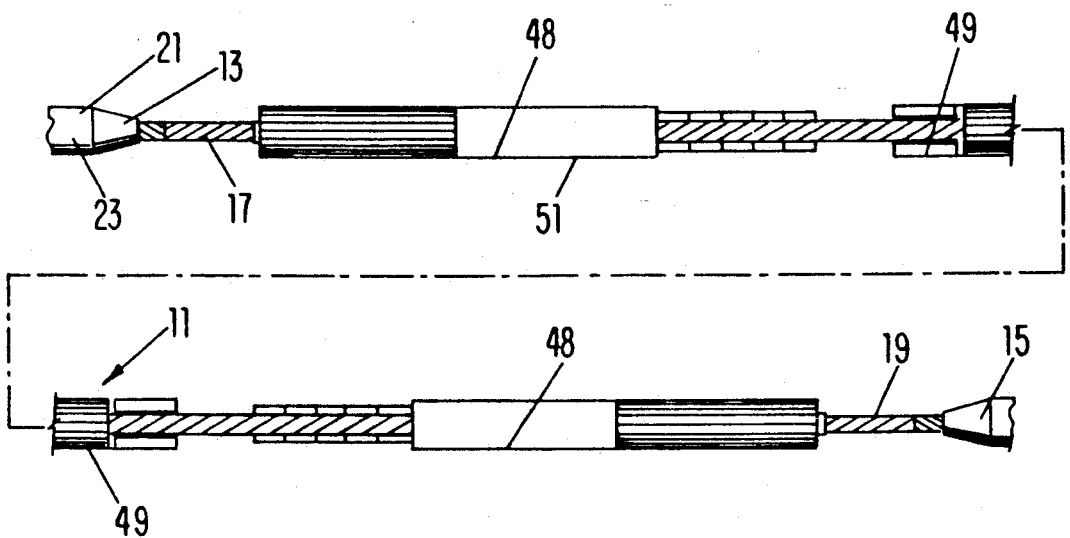
FIG. 1 shows a side view of the device of the present invention for connecting two ends of a steel cable conveyor belt.

The device for endlessly connecting ends of a steel cable conveyor belt is primarily characterized by two abutment pieces that are connected to one another by separate steel cable sections in a pull-resistant manner and are provided with bores, with end sections of the steel cables being guided through the bores and being provided at free ends thereof that protrude from the bores with means for enlarging the free ends; at least one intermediate piece that is insertable between the two abutment pieces and the separate steel cable sections before resuming operation of the steel cable conveyor belt, the intermediate piece being in a frictional connection with the separate steel cable sections; and a respective surface of the abutment pieces and the intermediate piece which is facing tensioning and drive rollers of the steel cable conveyor belt is provided with a layer of a friction-increasing material. The device is introduced between the two ends of steel cable conveyor belt, respectively, the end portions of the steel cables and bridges the missing length which results from the breakage of the steel cable conveyor belt so that the length of the conveyor belt which is required to maintain the fixed axle distance remains the same. With the device of the present invention the connection of the conveyor belt may be achieved with simple technical means on site since a vulcanization of the connection is not required.

Preferably, the enlarging means is comprised of a plurality of deformable sleeves that are pressed onto the free ends of the steel cables. The deformable sleeves may be made of metal.

In a preferred embodiment, the abutment pieces have further bores through which the separate steel cable sections are guided whereby free ends of the separate steel cable sections that are protruding from the further bores are provided with sleeves that are pressed thereon and have an outer diameter that is greater than an inner diameter of the further bores. Furthermore, the intermediate piece at sides thereof that are parallel to an extension of the separate steel cable sections has grooves for receiving the separate steel cable sections. Preferably, the intermediate piece at the aforementioned sides thereof is provided with a respective central recess in which a portion of the separate steel cable sections is exposed and provided with means for enlarging the exposed portion. These further enlarging means may be in the form of a metal sleeve that is pressed on.

It is preferable that the surface of the abutment pieces and the intermediate piece which is facing tensioning and drive rollers of the steel cable conveyor belt has a friction-increasing layer which is made of rubber.

After the introduction of the end portions of the steel cables into the abutment pieces the free ends thereof that protrude from the bores are provided with means for enlarging the free ends. This may be achieved by simple technical measures, for example, by fanning out the ends etc. The abutment pieces, before being delivered to the site, have been connected to one another by the separate steel cable sections in a workshop. After the end portions of the steel cables have been connected to the abutment pieces, the intermediate piece is then introduced between the separate steel cable sections which are not yet tensioned. This intermediate piece will fix the separate steel cable sections in their position after the tensioning of the conveyor belt. Due to the friction-increasing layer at the respective surfaces of the abutment pieces and the intermediate piece which are facing the tensioning and drive rollers of the conveyor belt the abutment pieces and the intermediate piece participate in the force transmission from the roller to the conveyor belt due to the resulting frictional connection.

In a preferred embodiment of the present invention the enlargement means for the free ends of the steel cables are comprised of a plurality of deformable short sleeves which are pressed onto the free ends of the steel cables protruding from the bores of the abutment pieces. The connection between the abutment pieces and the end portions of the steel cables of the conveyor belt may thus be performed with simple tools at the site of the conveyor belt to be repaired. The force required to press on the individual short sleeves is low. The short sleeves may be mounted in a space-saving manner.

In another preferable embodiment of the present invention the sleeves are made of a metal. This allows for a good deformability of the sleeves with the advantage of a solid clamping connection at the free ends of the end portions of the steel cables.

In another preferable embodiment the abutment pieces have further bores through which the separate steel cable sections are guided, whereby the free ends of the separate steel cable sections which are protruding from these bores are provided with sleeves that are pressed thereon and have an outer diameter that is greater than an inner diameter of these bores. The sleeves are preferably long and provide a space-saving securement of the abutment pieces which may be achieved in a simple manner with conventional tools whereby a good stability of the sleeve arrangement is ensured.

It is possible to use more than one intermediate piece between the abutment pieces so that with this embodiment a longer missing length within the conveyor belt may be bridged.

When the intermediate piece, at sides thereof that are parallel to an extension of the separate steel cable sections, is provided with grooves for receiving these separate steel cable sections than the intermediate piece is easily insertable after the mounting of the abutment pieces to the ends of the conveyor belt. The initial mounting of the abutment pieces to the ends of the conveyor belt is thus not impeded by the intermediate pieces.

When the intermediate piece, at the sides that are parallel to the extension of the separate steel cable sections, is additionally provided with central recesses in which portions of the separate steel cable sections are exposed and are provided with means for enlarging the exposed portions this embodiment results in a simple realization of the force-locking coupling of the intermediate piece to the parallel separate steel cable sections. In this manner, no further mounting measures are required at the site. Preferably, the enlargement means is in the form of a metal sleeve that is pressed on.

The present invention further relates to a method for connecting the ends of a ruptured steel cable conveyor belt by employing the device according to claim 1 of the present invention. The method of the present invention for endlessly connecting ends of a steel cable conveyor belt comprising a plurality of steel cables by pull-resistantly coupling the ends which are oppositely arranged from one another by a device which comprises two abutment pieces that are connected to one another by separate steel cable sections in a pull-resistant manner and are provided with bores, and at least one intermediate piece that is insertable between the two abutment pieces and the separate steel cable sections, with a respective surface of the abutment pieces and the intermediate piece which is facing tensioning and drive rollers of the steel cable conveyor belt being provided with a layer of a friction-increasing material, comprises the steps of: retracting a tensioning roller of the steel cable conveyor belt; removing cover plates over a sufficient length of the ends of the cable conveyor belt; removing rubber from between the steel cables over the length of the ends of the steel cable conveyor belt to expose end portions of the steel cables; cutting the end portions of the steel cables to a same length; sliding the end portion of the steel cables through the bores of the abutment pieces; sliding sleeves over free ends of the end portions that are protruding from the bores; pressing the sleeves onto the free ends; inserting the intermediate piece between the abutment pieces and the separate steel cable sections; and tensioning the steel cable conveyor belt by repositioning the tensioning roller.

It is preferable that after the step of removing rubber from between the steel cables, the end portions of the steel cables that are arranged at outer edges of the steel cable conveyor belt are cut back by essentially a length of the end portions. This prevents that the width of the emergency connection is wider than the steel cable conveyor belt. In this manner it is possible to adapt the endless connection to be produced to the width of the steel cable conveyor belt.

With the present invention it is possible to provide a temporary connection for an conveyor belt which is indispensible for a conveying process within a short period of time so that the production respectively the conveying process may be continued until a production interruption is scheduled.

DESCRIPTION OF PREFERRED EMBODIMENTS

The present invention will now be described in detail with the aid of several specific embodiments utilizing FIGS. 1 to 4.

Figure 2:
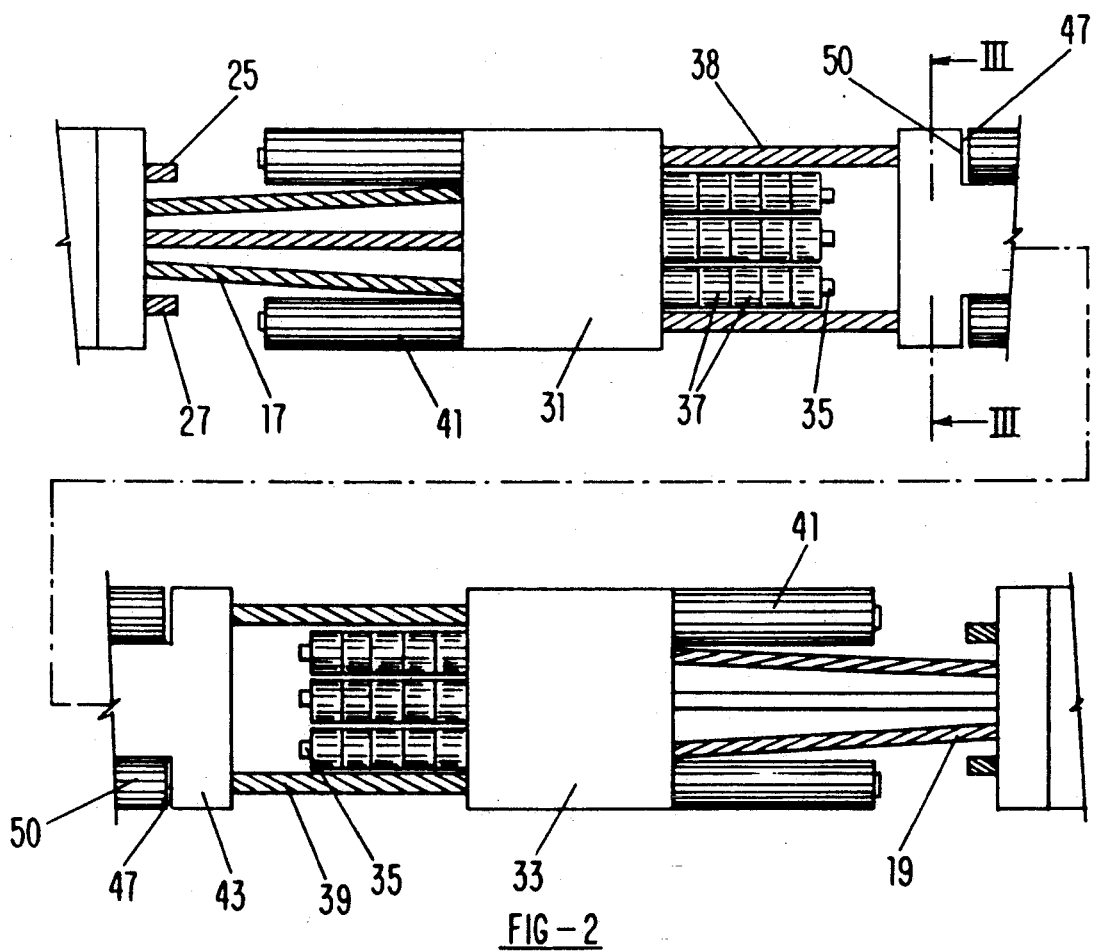
FIG. 2 is a plan view of the device according to FIG. 1.
Figure 3:
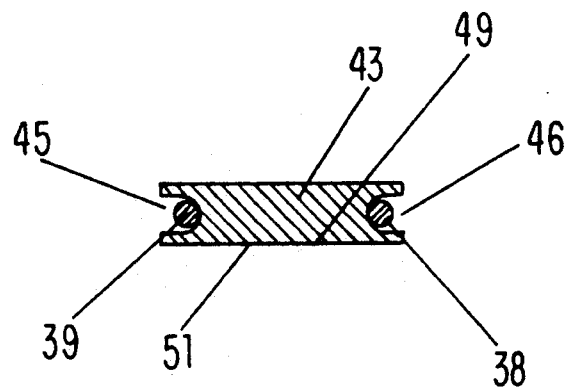
FIG. 3 is a cross-sectional view of the intermediate piece of the device along the line III—III of FIG. 2.
Figure 4:
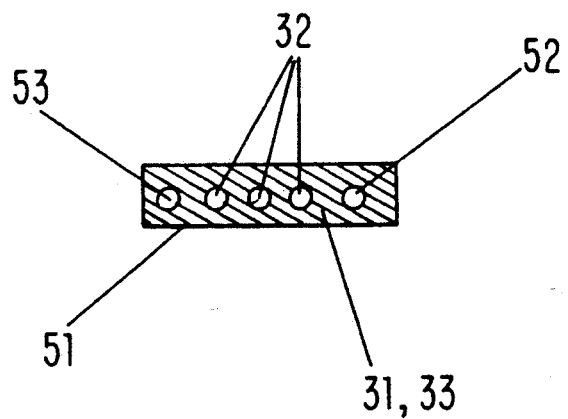
FIG. 4 shows a cross-sectional view of an abutment piece without steel cables.

The two ends 13, 15 of a steel cable conveyor belt are represented in FIGS. 1 and 2 which are connected by a temporary connecting device 11. The end portions 17, 19 of the steel cables of each end 13, 15 of the steel cable conveyor belt are exposed by removing the rubber cover plates 21, 23 and the rubber which is present between the steel cable end portions 17, 19. The two steel cables which are arranged at outer edges of the steel cable conveyor belt are cut back by essentially a length of the end portions of the steel cables. The remaining end portions of the steel cables 17, 19 are cut to the same length and are guided through bores 32 of a parallelepipedal abutment piece 31, respectively 33. Onto the protruding free ends 35 a plurality of short sleeves 37 are pressed, the outer diameter of which is greater than the inner diameter of the respective bores of the abutment pieces 31, 33.

The two abutment pieces 31 and 33 are connected via two parallel separate outer steel cable sections 38 and 39. The ends of these steel cable sections 38, 39 are guided through respective bores 52, 53 and penetrate the abutment pieces 31, 33. The free ends of the steel cable sections 38, 39 which are protruding from the bores 52, 53 are secured by long aluminum sleeves 41 which are pressed onto the free ends.

In the middle between the two abutment pieces 31 and 33 an intermediate piece 43 is inserted between the two steel cable sections 38 and 39. The intermediate piece is provided with a respective groove 45, 46 on either side that is parallel to the extension of the steel cable sections 38 and 39. With the aid of the intermediate piece 43, the steel cable sections 38, 39 are fixed at a predetermined distance relative to the radius of the drive roller during operation of the conveyor belt. The intermediate piece 43 is also provided with recesses 47 at the sides that are parallel to the extension of the steel cable sections 38 and 39. The recesses 47 serve to receive sleeves 50 which are pressed onto the steel cable sections 38, 39.

The respective surfaces of the abutment pieces 31, 33 and the intermediate piece 43 which come into contact with the drive and guide rollers of the conveyor belt system are provided with a rubber layer 51.

The function of the aforementioned device is described in the following paragraph.

The entire coupling piece 11 is premounted outside the conveying area in a workshop. At the site, the abutment pieces 31, 33, together with the exposed ends 17, 19 of the steel cables of each end of the conveyor belt 13, 15 are connected in a force-locking manner. Accordingly, the end portions 17, 19 of the steel cables are guided through the bores 32 of the abutment pieces 31, 33. The sleeves 37 are positioned on the free ends 35 which are protruding from the bores 32 and are clamped onto the free ends 35 with a respective tool, for example, a pressing tool or jointing clamp. Between the steel cable sections 38, 39 the intermediate piece 43 is introduced. When the thus endlessly connected conveyor belt is tensioned the conveying process may resume. The fixed axle distance of the conveying path must not be altered The present invention is, of course, in no way restricted to the specific disclosure of the specification and drawings, but also encompasses any modifications within the scope of the appended claims.

What I claim is:

1. A device for endlessly connecting ends of a steel cable conveyor belt comprising a plurality of steel cables by pull-resistantly coupling said ends which are oppositely arranged from one another, said device comprising:
    two abutment pieces that are connected to one another by separate steel cable sections in a pull-resistant manner and are provided with bores, with end portions of said steel cables being guided through said bores and being provided at free ends thereof that protrude from said bores with means for enlarging said free ends;
    at least one intermediate piece that is insertable between said two abutment pieces and said separate steel cable sections before resuming operation of the steel cable conveyor belt, said intermediate piece being in a frictional connection with said separate steel cable sections; and
    a respective surface of said abutment pieces and said intermediate piece which is facing tensioning and drive rollers of the steel cable conveyor belt is provided with a layer of a friction-increasing material.

2. A device according to claim 1, wherein said enlarging means is comprised of a plurality of deformable sleeves that are pressed onto said free ends.

3. A device according to claim 2, wherein said deformable sleeves are made of metal.

4. A device according to claim 1, wherein said abutment pieces have further bores through which said separate steel cable sections are guided, and with free ends of said separate steel cable sections that are protruding from said further bores being provided with sleeves that are pressed thereon and have an outer diameter that is greater than an inner diameter of said further bores.

5. A device according to claim 1, wherein said intermediate piece at sides thereof parallel to an extension of said separate steel cable sections has grooves for receiving said separate steel cable sections.

6. A device according to claim 5, wherein said intermediate piece at said sides thereof is provided with central recesses in which portions of said separate steel cable sections are exposed and are provided with further means for enlarging said exposed portions.

7. A device according to claim 6, wherein said further enlarging means is in the form of a metal sleeve that is pressed on.

8. A device according to claim 1, wherein said friction-increasing material is rubber.

9. A method for endlessly connecting ends of a steel cable conveyor belt comprising a plurality of steel cables by pull-resistantly coupling said ends which are oppositely arranged from one another by a device which comprises two abutment pieces that are connected to one another by separate steel cable sections in a pull-resistant manner and are provided with bores, and at least one intermediate piece that is insertable between said two abutment pieces and said separate steel cable sections, with a respective surface of said abutment pieces and said intermediate piece which is facing tensioning and drive rollers of the steel cable conveyor belt being provided with a layer of a friction-increasing material; said method comprising the steps of:
    retracting a tensioning roller of the steel cable conveyor belt;
    removing cover plates over a sufficient length of said ends of said steel cable conveyor belt;
    removing rubber from between said steel cables over said length of said ends of said steel cable conveyor belt to expose end portions of said steel cables;
    cutting said end portions of said steel cables to a same length;
    sliding said end portions of said steel cables through said bores of said abutment pieces;
    sliding sleeves over free ends of said end portions that are protruding from said bores;
    pressing said sleeves onto said free ends;
    inserting said intermediate piece between said abutment pieces and said separate steel cable sections; and
    tensioning said steel cable conveyor belt by repositioning said tensioning roller.

10. A method according to claim 1, further comprising the step of:
    after said step of removing rubber from between said steel cables, cutting back ones of said end portions of said steel cables that are arranged at outer edges of said steel cable conveyor belt by essentially a length of said end portions.

* * * * *